US012657578B2

(12) United States Patent
Mallela et al.

(10) Patent No.: US 12,657,578 B2
(45) Date of Patent: Jun. 16, 2026

(54) SYSTEMS AND METHODS FOR DISTRIBUTED-LEDGER BASED INTERCOMPANY NETTING

(71) Applicant: JPMORGAN CHASE BANK, N.A., New York, NY (US)

(72) Inventors: Naveen Mallela, Singapore (SG); Gourang Shah, Singapore (SG); Varoon Mandhana, Singapore (SG); Martijn Stoker, Singapore (SG); Manoj Dugar, Singapore (SG); Abhijit Gupta, Singapore (SG)

(73) Assignee: JPMORGAN CHASE BANK, N.A., New York, NY (US)

( * ) Notice: Subject to any disclaimer, the term of this patent is extended or adjusted under 35 U.S.C. 154(b) by 190 days.

(21) Appl. No.: 18/177,687

(22) Filed: Mar. 2, 2023

(65) Prior Publication Data

US 2023/0206223 A1 Jun. 29, 2023

Related U.S. Application Data

(63) Continuation of application No. 16/444,462, filed on Jun. 18, 2019, now Pat. No. 11,620,645.

(Continued)

(51) Int. Cl.
*G06Q 20/36* (2012.01)
*G06Q 20/10* (2012.01)

(52) U.S. Cl.
CPC ......... *G06Q 20/3678* (2013.01); *G06Q 20/10* (2013.01); *G06Q 2220/00* (2013.01)

(58) Field of Classification Search
CPC .............. G06Q 20/3678; G06Q 20/10; G06Q 2220/00; G06Q 20/223; G06Q 20/381; G06Q 20/367; H04L 9/50
See application file for complete search history.

(56) References Cited

U.S. PATENT DOCUMENTS

| | | | | |
|---|---|---|---|---|
| 10,929,842 B1* | 2/2021 | Arvanaghi | ............ | H04L 9/3239 |
| 2017/0109735 A1* | 4/2017 | Sheng | ................ | G06Q 20/3678 |

(Continued)

FOREIGN PATENT DOCUMENTS

| | | |
|---|---|---|
| JP | 2008512777 | 4/2008 |
| JP | 2002366876 | 12/2022 |

(Continued)

OTHER PUBLICATIONS

Examination Report, dated Aug. 29, 2023, from corresponding Australian Patent Application No. 2019288204.

(Continued)

*Primary Examiner* — Lynda Jasmin
(74) *Attorney, Agent, or Firm* — GREENBERG TRAURIG LLP

(57) ABSTRACT

A method for distributed-ledger based intercompany netting may include: receiving, from a first entity within an organization, a deposit of a first amount of funds to a first account; tokenizing the first amount of funds and writing the first amount of funds to a first token wallet for the first entity on a distributed ledger; receiving, from a second entity within an organization, a deposit of a second amount of funds to a second account; tokenizing the second amount of funds and writing the second amount of funds to a second token wallet for the second entity on the distributed ledger; and executing a transaction involving a transfer of a transaction amount from the first entity to the second entity by deducting the transaction amount from a token balance in the first wallet and adding the transaction amount to a token balance in the second wallet.

11 Claims, 2 Drawing Sheets

Related U.S. Application Data

(60) Provisional application No. 62/686,131, filed on Jun. 18, 2018.

(56) References Cited

U.S. PATENT DOCUMENTS

| | | |
|---|---|---|
| 2017/0230189 A1 | 8/2017 | Toll et al. |
| 2017/0300876 A1* | 10/2017 | Musiala, Jr. ........... G06Q 40/02 |

FOREIGN PATENT DOCUMENTS

| | | |
|---|---|---|
| WO | 2017011601 | 1/2017 |
| WO | 2017145004 | 8/2017 |

OTHER PUBLICATIONS

Japanese Office Action, dated Dec. 20, 2023, from corresponding Japanese Patent Application No. 2020-570699.

* cited by examiner

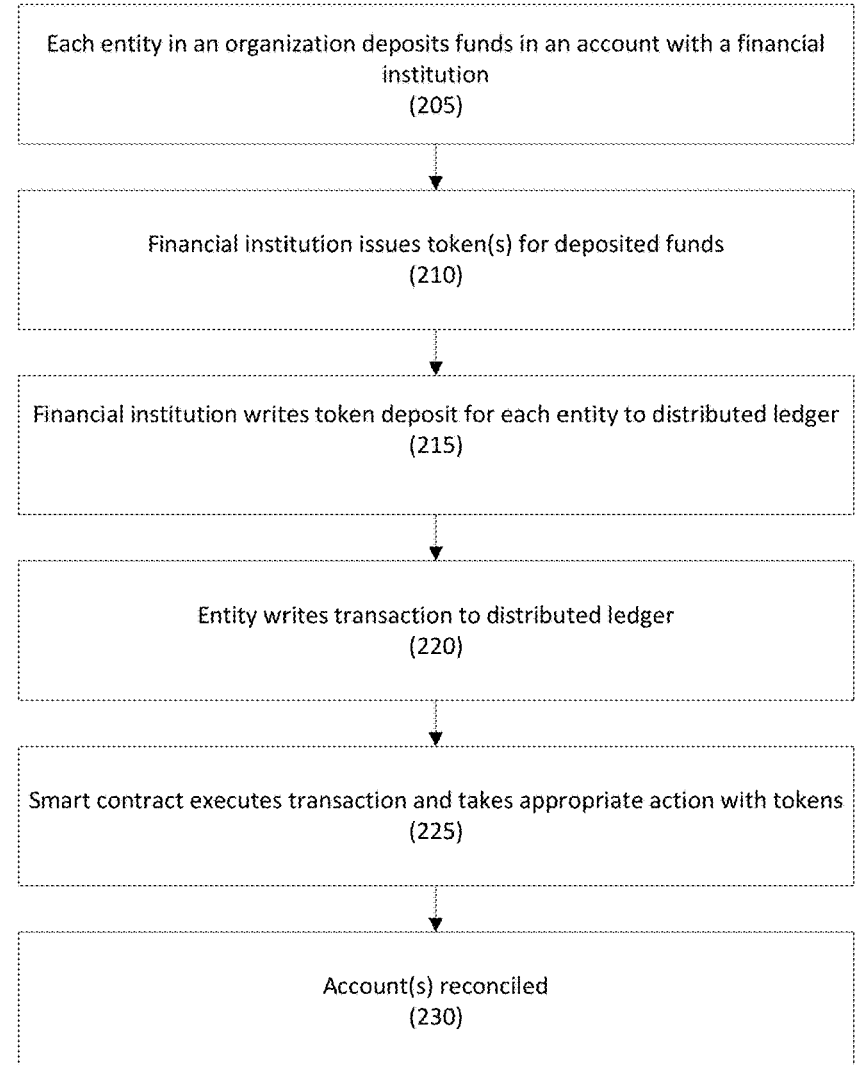

Each entity in an organization deposits funds in an account with a financial institution
(205)

Financial institution issues token(s) for deposited funds
(210)

Financial institution writes token deposit for each entity to distributed ledger
(215)

Entity writes transaction to distributed ledger
(220)

Smart contract executes transaction and takes appropriate action with tokens
(225)

Account(s) reconciled
(230)

FIGURE 2

SYSTEMS AND METHODS FOR DISTRIBUTED-LEDGER BASED INTERCOMPANY NETTING

RELATED APPLICATIONS

This application is a continuation of U.S. patent application Ser. No. 16/444,462, filed Jun. 18, 2019, now U.S. Pat. No. 11,620,645, which claims priority to, and the benefit of, U.S. Provisional Patent Application Ser. No. 62/686,131, filed Jun. 18, 2018, the disclosers of each of which are hereby incorporated, by reference, in their entirety.

BACKGROUND OF THE INVENTION

1. Field of the Invention

The present disclosure generally relates to systems and methods for distributed-ledger based intercompany netting.

2. Description of the Related Art

Intercompany Netting is a process that helps in optimizing capital, mitigating risk, and lowering transaction cost. The process, however, remains time consuming, involves multiple steps, and is dependent on multiple parties.

SUMMARY OF THE INVENTION

Systems and methods for distributed-ledger based intercompany netting are disclosed. In one embodiment, in an information processing apparatus comprising at least one computer processor, a method for distributed-ledger based intercompany netting may include: (1) receiving, from a first entity within an organization, a deposit of a first amount of funds to a first account; (2) tokenizing the first amount of funds and writing the first amount of funds to a first token wallet for the first entity on a distributed ledger; (3) receiving, from a second entity within an organization, a deposit of a second amount of funds to a second account; (4) tokenizing the second amount of funds and writing the second amount of funds to a second token wallet for the second entity on the distributed ledger; and (5) executing a transaction involving a transfer of a transaction amount from the first entity to the second entity by deducting the transaction amount from a token balance in the first wallet and adding the transaction amount to a token balance in the second wallet.

In one embodiment, the first amount of funds and the second amount of funds may be tokenized with a one-to-one correspondence with a base currency.

In one embodiment, the method may further include applying a restriction to the first amount of funds in the first account after the first amount of funds is tokenized, wherein the restriction restricts access to the first amount of funds in the account.

In one embodiment, the method may further include receiving a surrender of a surrender token amount from the first entity; deducting the surrender token amount from the first wallet; and releasing the restriction on the surrender amount of funds in the first account.

In one embodiment, the tokens in the first wallet may correspond to the surrender amount are destroyed or deleted in response to the deduction.

In one embodiment, the deduction for the first wallet may be written to the distributed ledger.

In one embodiment, the method may further include reconciling the first account and the second account based on the balances in the first wallet and the second wallet, respectively.

In one embodiment, the step of deducting the transaction amount from a token balance in the first wallet and adding the transaction amount to a token balance in the second wallet may be performed by a smart contact.

In one embodiment, the first entity, the second entity, and the financial institution may be nodes in a distributed ledger network and each maintain a copy of the distributed ledger.

In one embodiment, the first account and/or the second account may be an escrow account, a treasury omnibus account, etc.

According to another embodiment, a system for distributed-ledger based intercompany netting may include a first entity within an organization; a second entity within an organization; and a financial institution that maintains a first account for the first entity, and a second account for the second entity. The financial institution may receive a deposit of a first amount of funds to the first account from the first entity; may tokenize the first amount of funds and writes the first amount of funds to a first token wallet for the first entity on a distributed ledger; may receive a deposit of a second amount of funds to the second account from the second entity; may tokenize the second amount of funds and writes the second amount of funds to a second token wallet for the second entity on the distributed ledger; and may write a transaction involving a transfer of a transaction amount from the first entity to the second entity to the distributed ledger. A smart contact executed by the distributed ledger may deduct the transaction amount from a token balance in the first wallet and adds the transaction amount to a token balance in the second wallet.

In one embodiment, the first amount of funds and the second amount of funds may be tokenized with a one-to-one correspondence with a base currency.

In one embodiment, the financial institution may apply a restriction to the first amount of funds in the first account after the first amount of funds is tokenized, wherein the restriction restricts access to the first amount of funds in the account.

In one embodiment, the financial institution may receive a surrender of a surrender token amount from the first entity, may deduct the surrender token amount from the first wallet, and may release the restriction on the surrender amount of funds in the first account.

In one embodiment, the tokens in the first wallet corresponding to the surrender amount may be destroyed or deleted in response to the deduction.

In one embodiment, a smart contract may write the deduction for the first wallet to the distributed ledger.

In one embodiment, the financial institution may reconcile the first account and the second account based on the balances in the first wallet and the second wallet, respectively.

In one embodiment, the first entity, the second entity, and the financial institution may be nodes in a distributed ledger network and each maintains a copy of the distributed ledger.

In one embodiment, the first account and/or the second account may be an escrow account.

BRIEF DESCRIPTION OF THE DRAWINGS

For a more complete understanding of the present invention, the objects and advantages thereof, reference is now made to the following descriptions taken in connection with the accompanying drawings in which:

FIG. 2 depicts a method for distributed-ledger based intercompany netting according to one embodiment.

DETAILED DESCRIPTION OF PREFERRED EMBODIMENTS

Figure 1:
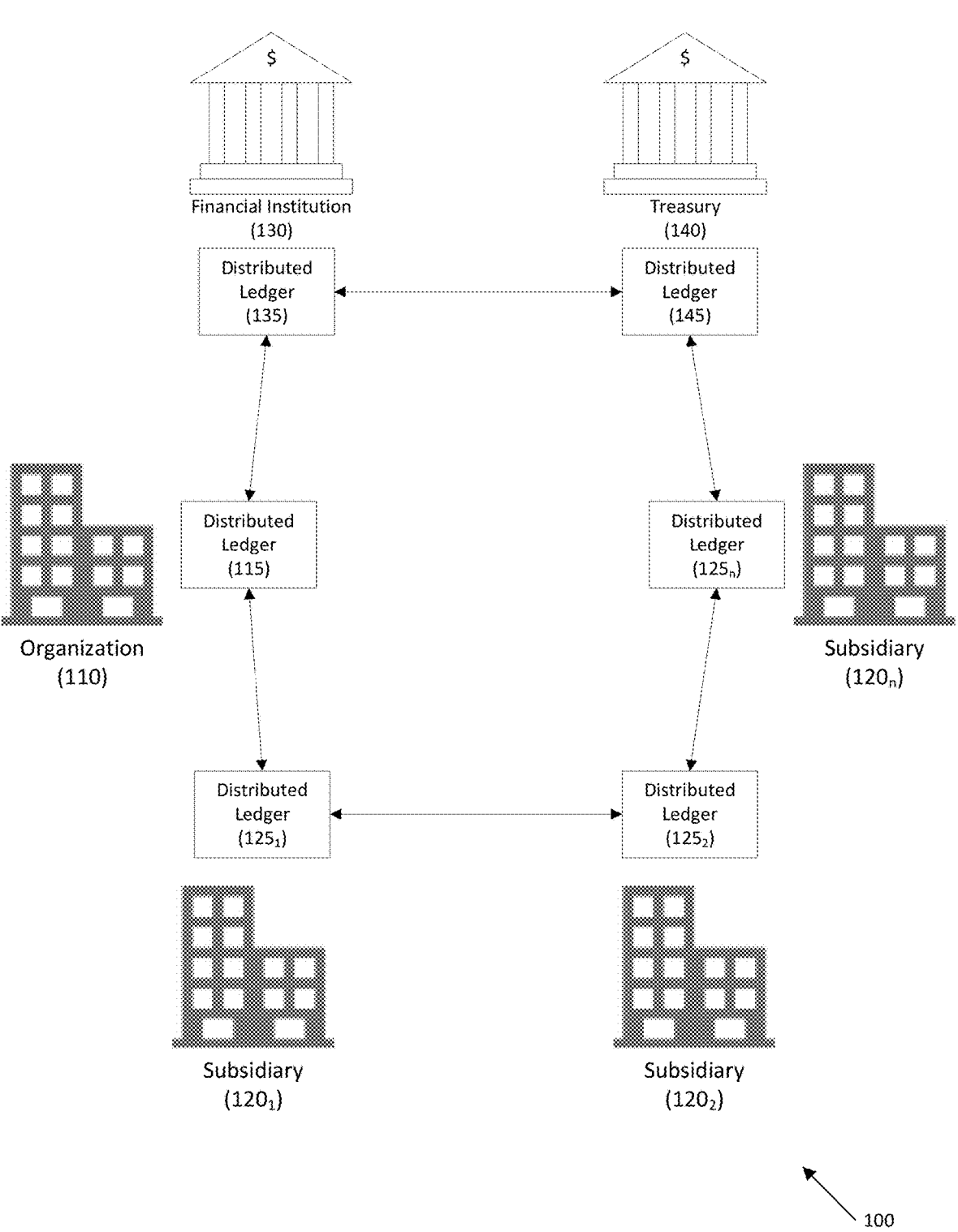
FIG. 1 depicts a system for distributed-ledger based intercompany netting according to one embodiment.

Embodiments are directed to the use of distributed ledgers, such as Blockchain distributed ledgers, for intercompany netting.

Distributed ledgers provide a peer-to-peer network with no central authority. They are secure and use cryptography to determine valid parties and transactions. Each step in a transaction is immutable as it is digitally signed with a strong audit trail, and each piece of data in a transaction can be given a unique fingerprint, such as a hash.

In embodiments, distributed ledgers, such as Blockchain distributed ledgers, may be used for intercompany netting. For example, fiat cash may be converted to corporate coins, or tokens. The corporate coins may be minted by a bank, and may be credited to a subsidiary wallet at the back of fiat currency collateral from a treasury. The subsidiaries may then settle their intercompany transactions using their corporate coins on a peer-to-peer basis. The subsidiaries may then redeem their corporate coins into any fiat currency through the bank.

Embodiments may improve transparency, eliminate steps, and may be automated and continuous.

Referring to FIG. 1, a system for distributed-ledger based intercompany netting is disclosed according to one embodiment. System 100 may include organization 110 which may be any type of organization (e.g., public, private, etc.). Organization may have one or more subsidiaries, lines of business, entities, etc. $120_1$, $120_2$, ... $120_n$. Organization 110 and subsidiaries $120_1$, $120_2$, ... $120_n$ may each have one or more account with financial institution 130. For example, financial institution 130 may maintain an account for organization 110 and subsidiaries $120_1$, $320_2$, ... $120_n$ and may issue tokens in exchange for deposits to the account.

In one embodiment, the account may be a treasury omnibus account that may hold cash from all the different entities against which tokens are issued. In another embodiment, the account may be an escrow account.

Treasury 140 may be provided, and may represent the corporate Treasury/HQ for organization 110.

Distributed ledger network 115, 125, 135, 145, etc. may be any suitable ledger, including, for example, Blockchain-based ledgers, Ethereum ledgers, etc. Organization 110, subsidiaries $120_1$, $120_2$, ... $120_n$ and financial institution 130 may each have a client (not shown) that may interact with distributed ledger network 115, 125, 135, 145 (e.g., write transactions to their respective copies of the distributed ledger).

In one embodiment, distributed ledger network 115, 125, 135, 145 may provide a smart contract platform, confidentiality (e.g., details of transactions may be private to the parties), security (e.g., advanced encryption, permissioned-only), and decentralization (e.g., no dependency on a central service). It may also provide digitalization of payments with real-time gross settlement capabilities, decentralized processing (e.g., distributed and resilient infrastructure with no single point of failure), settlement finality (e.g., final and irrevocable settlement of payment instructions with deterministic finality), and may optimize liquidity by implementing netting and gridlock resolution algorithms to maximize liquidity efficiency.

In addition, distributed ledger network 115, 125, 135, 145 may be provided with a zero-knowledge security layer, which may enable mass conservation and prevention of double-spend for shielded tokens without compromising decentralized nature of the ledger, and may use zk-SNARKs (zero-knowledge cryptographic proofs).

In one embodiment, smart contacts may execute based on the contents of distributed ledger network 115, 125, 135, 145. For example, smart contracts may function to increase or decrease organization 110 or subsidiary 120's tokens in response to a transaction that is written to distributed ledger network 115, 125, 135, 145, may cause financial institution 130 to issue cash to organization 110 or subsidiary 120 in response to a surrender of tokens, etc.

Embodiments may further include third party customers (not shown), third party suppliers (not shown), third party distributors (not shown), etc. These third parties may also deposit funds to an account, and my also access distributed ledger network 115, 125, 135, 145 to write transactions.

Referring to FIG. 2, a method for distributed-ledger based intercompany netting is disclosed according to one embodiment.

In step 205, each entity in an organization (e.g., a subsidiary) may deposit funds in an account with a financial institution. In one embodiment, each entity may be a separate legal entity, lines of business, or any part of a larger organization that may have its own budget.

In one embodiment, a single account may be used for multiple entities in the organization; in another embodiment, each entity may have its own account.

In one embodiment, the account may be a treasury omnibus account that may hold cash from all the different entities against which tokens are issued. In another embodiment, the account may be an escrow account.

In step 210, the financial institution may issue token(s) for the deposited funds. In one embodiment, the tokens may be issued to have a one-to-one correspondence with the unit of currency deposited (e.g., one token for each dollar, etc.). Thus, if an entity deposits $10,000, it may be issued 10,000 tokens. Other ratios and correspondences may be used as is necessary and/or desired.

In step 215, the financial institution may write the token deposits for each entity to a distributed ledger in a distributed ledger network. In one embodiment, the token deposit may be added to an existing token balance for each entity.

In one embodiment, the distributed ledger may be a Blockchain-based distributed ledger. Other suitable ledgers may be used as is necessary and/or desired.

In one embodiment, each entity may maintain a wallet on the distributed ledger, and the wallet may reflect the respective entity's token balance.

In one embodiment, after the funds are tokenized, a restriction may be associated with the corresponding funds to that they are identified as not available or otherwise restricted from being accessed, withdrawn, or transferred. Any suitable manner of restricting access to the tokenized funds may be used as is necessary and/or desired.

In step 220, a first organizational entity may write a transaction involving a second organizational entity to the distributed ledger. In one embodiment, the first entity may identify the source of the funds, the recipient of the funds, the amount, etc. In one embodiment, the transaction may identify the number of tokens that correspond to the amount of the transaction.

Any other information may be provided as is necessary and/or desired.

In step 225, a smart contract may execute the transaction and may take the appropriate action with the tokens. For example, if the transaction involves the first entity transferring funds to the second entity, the smart contact may debit the number of tokens in from the source of the funds (e.g., the first entity's wallet), and deposit tokens to the recipient of the funds (e.g., the second entity's wallet).

In one embodiment, the transaction may only involve the first entity, such as when the first entity surrenders tokens for cash. In one embodiment, when the tokens are surrendered, the tokens may be destroyed, deleted, etc., and any restrictions on the corresponding funds may be released. Thus, the entity may be able to access, withdraw, transfer, etc. funds from the account as desired.

In another embodiment, the smart contract may provide the corresponding funds to the surrendering entity's account in exchange for the surrender of the tokens.

In step 230, the accounts and the wallets may be reconciled to reflect one or more transaction. In one embodiment, the accounts may be reconciled periodically (e.g., daily, weekly, etc.), on demand, or as otherwise necessary and/or desired.

In one embodiment, smart contracts may compute interest based on deposit rates for the outstanding tokens, cause tokens to self-destruct, auto-redeem to fiat cash based on an outstanding time period, and perform tax computations on token movements (e.g., withholding tax, etc.).

Embodiments may provide some or all of the following advantages and improvements: they may increase operating liquidity (e.g., operating liquidity trapped with subsidiaries centralized by design without sacrificing de-centralized control over cash); increase efficiency (e.g., physical cash flows replaced with real time corporate coin/token transfers thereby eliminating process and infrastructure in-efficiencies); and simplify foreign exchange handling.

Although several embodiments have been disclosed, it should be recognized that these embodiments are not mutually exclusive, and features from one may be used with others.

The following documents are hereby incorporated, by reference, in their entireties: U.S. patent application Ser. Nos. 15/903,215; 15/903,159; 15/475,846; 15/797,602; 62/414,398; 62/534,772 and PCT Application No. PCT/US17/59015.

Hereinafter, general aspects of implementation of the systems and methods of the invention will be described.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ operating systems, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for distributed-ledger based intercompany netting, comprising:

in an information processing apparatus comprising at least one computer processor:

receiving, from a first entity within an organization, a deposit of a first amount of fiat currency funds to a first account for storing a fiat currency, wherein the first amount of funds are tokenized with a one-to-one correspondence with a base currency;

restricting access to the first amount of funds in the first account after the first amount of fiat currency funds is tokenized;

receiving a surrender of a surrender token amount from the first entity;

deducting the surrender token amount from a first wallet, wherein the surrender token in the first wallet corresponding to the surrender token amount are destroyed in response to the deduction;

writing the deduction for the first wallet to a distributed ledger;

releasing the restriction on the surrender amount of funds in the first account;

executing, in response to a transaction, a tokenization smart contract, wherein the tokenization smart contract increases or decreases tokenization of the first amount of fiat currency funds to digital token funds and writing the first amount of digital token funds to the first wallet for the first entity on the distributed ledger;

receiving, from a second entity within an organization, a deposit of a second amount of fiat currency funds to a second account for storing the fiat currency;

tokenizing the second amount of fiat currency funds to digital token funds and writing the second amount of digital token funds to a second wallet for the second entity on the distributed ledger; and executing a transaction involving a transfer of a transaction amount from the first entity to the second entity by deducting the transaction amount of digital token funds from a token balance in the first wallet and adding the transaction amount of digital token funds to a token balance in the second wallet, wherein the distributed ledger comprises a blockchain network, the blockchain network recording each transaction immutably using cryptographic validation; wherein the tokenization smart contract and transaction execution utilize zero-knowledge cryptographic proofs; wherein the blockchain network provides a real-time audit trail of token movements and enforces settlement finality for each transaction; and wherein the blockchain network includes a zero-knowledge security layer.

2. The method of claim 1, further comprising: reconciling the first account and the second account based on the balances in the first wallet and the second wallet, respectively.

3. The method of claim 1, wherein deducting the transaction amount from a token balance in the first wallet and adding the transaction amount to a token balance in the second wallet is performed by a smart contact.

4. The method of claim 1, wherein the first entity, the second entity, and a financial institution are nodes in a distributed ledger network and each maintain a copy of the distributed ledger.

5. The method of claim 1, wherein the first account or the second account comprises an escrow account.

6. The method of claim 1, wherein the first account or the second account comprises a treasury omnibus account.

7. A system for distributed-ledger based intercompany netting, comprising:

a first entity within an organization;

a second entity within an organization; and a financial institution that maintains a first account for the first entity, and a second account for the second entity, wherein the first account and the second account are configured to store a fiat currency;

wherein:

the financial institution receives a deposit of a first amount of fiat currency funds to the first account from the first entity;

in response to a first transaction, a tokenization smart contract executes, wherein the tokenization smart contract increases or decreases tokenization of the first amount of fiat currency funds to digital token funds and writes the first amount of digital token funds to a first wallet for the first entity on a distributed ledger;

the financial institution restricts the first amount of funds in the first account after the first amount of funds is tokenized, wherein the restriction restricts access to the first amount of fiat currency funds in the account;

the financial institution receives a deposit of a second amount of fiat currency funds to the second account from the second entity, wherein the first amount of fiat currency funds and the second amount of fiat currency funds are tokenized with a one-to-one correspondence with a base currency;

the financial institution tokenizes the second amount of fiat currency funds and writes the second amount of digital token funds to a second wallet for the second entity on the distributed ledger;

the first entity writes a transaction involving a transfer of a transaction amount from the first entity to the second entity to the distributed ledger;

the financial institution receives a surrender of a surrender token amount from the first entity; the smart contract deducts the surrender token amount from the first wallet, wherein the tokens in the first wallet corresponding to the surrender amount are destroyed or deleted in response to the deduction; the financial institution releases the restriction on the surrender amount of funds in the first account;

the financial institution receives a surrender of a surrender token amount from the first entity;

the smart contract deducts the surrender token amount from the first wallet, wherein the tokens in the first wallet corresponding to the surrender amount are destroyed or deleted in response to the deduction;

the financial institution releases the restriction on the surrender amount of funds in the first account; and the smart contract executed by the distributed ledger deducts the transaction amount of digital token funds from a token balance in the first wallet and adds the transaction amount of digital token funds to a token balance in the second wallet, wherein the distributed ledger comprises a blockchain network, the blockchain network recording each transaction immutably using cryptographic validation; wherein the tokenization smart contract and transaction execution utilize zero-knowledge cryptographic proofs; wherein the blockchain network provides a real-time audit trail of token movements and enforces settlement finality for each transaction; and wherein the blockchain network includes a zero-knowledge security layer.

8. The system of claim 7, wherein a smart contract writes the deduction for the first wallet to the distributed ledger.

9. The system of claim 7, wherein the financial institution reconciles the first account and the second account based on the balances in the first wallet and the second wallet, respectively.

10. The system of claim 7, wherein the first entity, the second entity, and the financial institution are nodes in a distributed ledger network and each maintains a copy of the distributed ledger.

11. The system of claim 7, wherein the first account or the second account comprises an escrow account.

\* \* \* \* \*